United States Patent
Sun

(10) Patent No.: US 10,119,658 B2
(45) Date of Patent: Nov. 6, 2018

(54) AQUEOUS FLOW IMPROVER FORMULATION FOR REFINED PRODUCTS

(71) Applicant: LIQUIDPOWER SPECIALTY PRODUCTS INC., Houston, TX (US)

(72) Inventor: Lu Sun, Stillwater, OK (US)

(73) Assignee: LIQUIDPOWER SPECIALTY PRODUCTS INC., Houston, TX (US)

( * ) Notice: Subject to any disclaimer, the term of this patent is extended or adjusted under 35 U.S.C. 154(b) by 0 days.

(21) Appl. No.: 15/105,277

(22) PCT Filed: Dec. 9, 2014

(86) PCT No.: PCT/US2014/069195
§ 371 (c)(1),
(2) Date: Jun. 16, 2016

(87) PCT Pub. No.: WO2015/094783
PCT Pub. Date: Jun. 25, 2015

(65) Prior Publication Data
US 2016/0312958 A1 Oct. 27, 2016

Related U.S. Application Data

(60) Provisional application No. 61/917,369, filed on Dec. 18, 2013.

(51) Int. Cl.
| | |
|---|---|
| *F17D 1/17* | (2006.01) |
| *C08J 3/05* | (2006.01) |
| *C08K 5/32* | (2006.01) |
| *F17D 3/12* | (2006.01) |

(52) U.S. Cl.
CPC ............ *F17D 1/17* (2013.01); *C08J 3/05* (2013.01); *C08K 5/32* (2013.01); *F17D 3/12* (2013.01); *C08J 2300/12* (2013.01); *C09K 2208/28* (2013.01)

(58) Field of Classification Search
CPC ............ F17D 1/17; C08J 3/05; C08K 5/32
See application file for complete search history.

(56) References Cited

U.S. PATENT DOCUMENTS

| | | | |
|---|---|---|---|
| 5,449,732 | A | 9/1995 | Smith et al. |
| 2007/0066713 | A1 | 3/2007 | Martin |
| 2010/0154893 | A1 | 6/2010 | Johnston et al. |

FOREIGN PATENT DOCUMENTS

| | | |
|---|---|---|
| CN | 101268128 A | 9/2008 |
| WO | 2007/027799 A1 | 4/2007 |
| WO | 2008/020388 A2 | 2/2008 |

OTHER PUBLICATIONS

Chinese Office Action (with attached English translation) for Application No. 201480075223.2; dated Jan. 29, 2018; 16 total pages.
Australian Examination Report for Application No. 2014366513; dated Sep. 20, 2017; 7 total pages.

*Primary Examiner* — Edward J Cain
(74) *Attorney, Agent, or Firm* — Patterson & Sheridan, LLP

(57) ABSTRACT

An aqueous drag reducer having the components of water, a hydrocarbon soluble rheology modifier and an ultra-high molecular weight polymer. This aqueous drag reducer is also soluble in hydrocarbons.

12 Claims, No Drawings

AQUEOUS FLOW IMPROVER FORMULATION FOR REFINED PRODUCTS

FIELD OF THE INVENTION

This invention relates to an aqueous flow improver formulation for refined products.

BACKGROUND OF THE INVENTION

Flow improvers for refined products, such as gasoline and diesel, typically contain a drag reducing agent and a carrier fluid containing alcohol, glycol, glycol ether and/or their mixtures. The majority of the cost of the flow improver typically lies with the carrier fluid. However, different formulations of alcohol, ether, ester carrier fluids have often tested unsatisfactory due to safety and price.

U.S. Pat. No. 5,449,732 attempts to solve the problem of carrier fluids by having the bulk polymerized polymers suspended in water. However this suspension can have a tendency to cause fouling in the refined product pipeline which can be attributed to precipitation of hydrophilic ingredients.

There exists a need to determine a cost effective fluid capable of operating as a carrier fluid for hydrocarbons that is compatible with hydrocarbons but does not cause fouling in the end product.

SUMMARY

An aqueous drag reducer having the components of water, a hydrocarbon soluble rheology modifier and an ultra-high molecular weight polymer is disclosed. This aqueous drag reducer is also soluble in hydrocarbons.

In an another embodiment an aqueous drag reducer is taught having the components of water, a surfactant, an amine oxide rheology modifier and an ultra-high molecular weight polymer with a molecular weight greater than five million. This aqueous drag reducer is also soluble in hydrocarbons.

In yet another embodiment a method is taught of first mixing water and a surfactant to produce a suspension medium. An ultra-high molecular weight polymer is incorporated into the suspension medium to produce a suspension. A hydrocarbon soluble rheology modifier is then added to the suspension to produce an aqueous drag reducer.

The disclosed technology provides an aqueous drag reducer including water, a rheology modifier and an ultra-high molecular weight polymer in which the aqueous drag reducer is soluble in hydrocarbons.

The disclosed technology further provides an aqueous drag reducer in which the rheology modifier is hydrocarbon soluble.

The disclosed technology further provides an aqueous drag reducer which includes a surfactant.

The disclosed technology further provides an aqueous drag reducer in which the rheology modifier is an amine oxide rheology modifier.

The disclosed technology further provides an aqueous drag reducer in which the amine oxide rheology modifier has an alkyl chain greater than C14.

The disclosed technology further provides an aqueous drag reducer in which the amine oxide rheology modifier includes oleyl dimethyl amine oxide, stearyl dimethylamine oxide, cetyl dimethylamine oxide, myristyl dimethyl amine oxide, lauryl dimethyl amine oxide, coco alkyl dimethyl amine oxide, decyl dimethyl amine oxide and alkyl dihydroxyethyl amine oxide or combinations thereof.

The disclosed technology further provides an aqueous drag reducer in which the hydrocarbons are refined hydrocarbons.

The disclosed technology further provides an aqueous drag reducer in which the ultra-high molecular weight polymer has a molecular weight greater than one million.

The disclosed technology further provides an aqueous drag reducer in which the aqueous drag reducer does not significantly change the viscosity of the hydrocarbons they are injected into.

The disclosed technology further provides an aqueous drag reducer in which the aqueous drag reducer is soluble in hydrocarbons at normal usage levels.

The disclosed technology further provides an aqueous drag reducer in which normal usage levels are less than 25 ppm of the ultra-high molecular weight polymer in hydrocarbons.

The disclosed technology further provides an aqueous drag reducer including water, an amine oxide rheology modifier, and an ultra-high molecular weight polymer with a molecular weight greater than five million in which the aqueous drag reducer is soluble in hydrocarbons.

The disclosed technology further provides a method including producing a suspension medium, incorporating an ultra-high molecular weight polymer to a suspension medium to produce a suspension, and adding a hydrocarbon soluble rheology modifier to the suspension to produce an aqueous drag reducer.

The disclosed technology further provides a method in which the suspension medium is made by mixing water and a surfactant.

The disclosed technology further provides a method including mixing water and a surfactant to produce a suspension medium, incorporating an ultra-high molecular weight polymer, with a molecular weight greater than five million, to the suspension medium to produce a suspension, adding an amine oxide rheology modifier to the suspension to produce an aqueous drag reducer, and injecting the aqueous drag reducer into a refined hydrocarbon pipeline.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

An aqueous drag reducer having the components of water, a hydrocarbon soluble rheology modifier and an ultra-high molecular weight polymer is disclosed. This aqueous drag reducer is also soluble in hydrocarbons. More specifically defined, the aqueous drag reducer is soluble in the refined products portion of hydrocarbons such as gasoline or diesel.

In one embodiment the aqueous drag reducer is soluble in hydrocarbons at normal usage levels. Normal usage levels are typically less than 25 ppm of the ultra-high molecular weight polymer in hydrocarbons. In other embodiments the normal usage levels can be less than 20 ppm or even 15 ppm.

The ultra-high molecular weight polymer is a polymer created through polymerization of monomers with molecular weight of at least one million. In other embodiments, the ultra-high molecular weight polymer has a molecular weight of at least two million or at least five million. Any conventionally known polymerization method can be used such as bulk polymerization or solution polymerization.

The monomers used in the polymerization can be carried out with a variety of monomers and monomer mixtures. It is preferred that sufficient high molecular weight monomers (carbon atom contents above about 4 and below 16) are present to produce a polymer which is ultimately substantially non-crystalline and hydrocarbon soluble. Substantial amounts of lower carbon atom monomers such as ethylene and propylene or higher carbon atom monomers such as 1-hexadecene or 1-octadecene may ultimately produce a more crystalline product which will be less soluble in flowing hydrocarbons. However, these materials can be present for whatever advantage they offer to particular solution problems in the specific flowing hydrocarbon systems. Thus from 5 to 50 mole percent of a C2 to C4 monomer is entirely feasible while achieving high molecular weights and dissolution in flowing hydrocarbons.

It is particularly useful to utilize mixtures of monomers, individually represented by C2, C3, C4, C5, C6, C8, C10, C12, C14, C16 and the like. Monomer mixtures appear to react at least as fast as individual monomers, but the resultant copolymers appear to have less crystallinity than homopolymers because of the different monomers used. While even carbon atom monomers are mentioned because of commercial availability, no technical reason exists to avoid adding odd carbon atom monomers, if available.

As mentioned above the polymerization method used can be any conventionally known method such as bulk polymerization or solution polymerization. In one embodiment the reaction occurs through bulk polymerization. In this method practice, a catalyst and a monomer are combined in a reaction vessel and agitated at ambient conditions for a period of time sufficient to increase viscosity of the reactants sufficiently to suspend the catalyst and then placed into a cool environment to allow the reaction to proceed. The cool environment can be maintained at a temperature from about 0° F. to about 80° F. (−17° C. to 27° C.) to relatively constant pace, while removing heat and forming ultra-high molecular weight polymers. Conversions of more than 95 percent can be obtained, although reaching such conversion levels may require several days.

Partially dependent upon the polymerization method the drag reducer can also contain chemicals common among conventional drag reducers such as buffers, hydrate inhibitors, surfactants and other commonly known drag reducer components.

The hydrocarbon soluble rheology modifier can be any rheology modifier with greater than 0.5 ppm solubility in gasoline or diesel fuel at 35° F. (2° C.). In another embodiment the hydrocarbon soluble rheology modifier can have solubility greater than 1000 ppm in gasoline or diesel fuel at 35° F. (2° C.).

When determining different hydrocarbon soluble rheology modifiers requests to Mason Chemical of Arlington Heights, Ill., The Dow Chemical Co. of Midland, Mich. and Elementis Specialties, Inc. East Windsor, N.J. were made to supply different rheology modifiers that would be applicable for our purposes. From the different rheology modifiers that were provided one possible group that was distinguished as amine oxide rheology modifiers.

The amine oxide rheology modifier can be any conventionally known rheology modifier with amine oxide present. In one embodiment the amine oxide rheology modifier has an alkyl chain greater than C14. Examples of rheology modifiers capable of use in this aqueous drag reducer include: oleyl dimethyl amine oxide, stearyl dimethylamine oxide, cetyl dimethylamine oxide, myristyl dimethyl amine oxide, lauryl dimethyl amine oxide, coco alkyl dimethyl amine oxide, decyl dimethyl amine oxide and alkyl dihydroxyethyl amine oxide, or combinations thereof.

In one embodiment the present method discloses mixing water and a surfactant to produce a suspension medium. An ultra-high molecular weight polymer was added to a suspension medium to produce a suspension. Afterwards a hydrocarbon soluble rheology modifier was added to the suspension to produce an aqueous drag reducer.

Any conventionally used surfactants can be capable of being used in the aqueous drag reducer. An example of surfactants that can be used include alkyl sulfates, alkyl ether sulfates, dialkyl sulfosuccinates, alkyl phosphates, alkyl aryl sulfonates, and sarcosinates. Suitable examples of commercially available surfactants include, but are not limited to, sodium lauryl sulfate (available as RHODAPON LSB from Rhodia Incorporated, Cranbury, N.J.), dioctyl sodium sulfosuccinate (available as AEROSOL® OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX® 40 from Norman, Fox & Co., Vernon, Calif.), and sodium lauroylsarcosinic (available as HAMPOSYL L-30 from Hampshire Chemical Corp., Lexington, Mass.).

Other surfactants that can be used include high HLB ethoxylated sorbitan esters, PEG fatty acid esters, ethoxylated glycerine esters, ethoxylated fatty amines, ethylene oxide block propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Other suitable examples of commercially available surfactants include, but are not limited to, nonylphenoxy and octylphenoxy poly(ethyleneoxy) ethanols (available as the IGEPAL® CA and CO series, respectively from Rhodia, Cranbury, N.J.), C8 to C18 ethoxylated primary alcohols (such as RHODASURF® LA-9 from Rhodia Inc., Cranbury, N.J.), C11 to C1-5 secondary-alcohol ethoxylates (available as the TERGITOL™ 15-S series, including 15-S-7, 15-S-9, 15-S-12, from Dow Chemical Company, Midland, Mich.), polyoxyethylene sorbitan fatty acid esters (available as the TWEEN® series of surfactants from Uniquema, Wilmington, Del.), polyethylene oxide (25) oleyl ether (available as SIPONIC™ Y-500-70 from American Alcolac Chemical Co., Baltimore, Md.), alkylaryl polyether alcohols (available as the TRITON™ X series, including X-100, X-165, X-305, and X-405, from Dow Chemical Company, Midland, Mich.).

The following examples of certain embodiments of the invention are given. Each example is provided by way of explanation of the invention, one of many embodiments of the invention, and the following examples should not be read to limit, or define, the scope of the invention.

Suspension mediums with differing polymer contents greater than 20 wt % were prepared with or without the help of either a nonionic surfactant Tergitol™ 15-S-7 or an anionic ammonium linoleate (formed in-situ by Pamolyn™ 200 with ammonia solution) surfactant, followed by addition of certain amount of hydrocarbon soluble rheology modifiers. As shown in Table 1 below a failure can be a result of destabilization of aqueous drag reducer (separation, solidification of polymer ingredient) or highly viscous aqueous drag reducer.

TABLE 1

| Rheology Modifiers | Manufacture | Suspensions w/ Ammonium Linoleate | | Suspensions w/ Tergitol™ 15-S-7 | | Suspensions w/ Macat® AO-18:1 Only | |
|---|---|---|---|---|---|---|---|
| | | 1 week | 3 months | 1 week | 3 months | 1 week | 3 months |
| Acrysol™ RM-8W | Dow Chemical | | | Fail | Fail | | |
| Acrysol™ RM-12W | Dow Chemical | Fail | Fail | Fail | Fail | | |
| Acrysol™ RM-895 | Dow Chemical | | | Fail | Fail | | |
| Acrysol™ RM-995 | Dow Chemical | | | Fail | Fail | | |
| Acrysol™ RM-2020NPR | Dow Chemical | | | Fail | Fail | | |
| Acusol™ 805S | Dow Chemical | Fail | Fail | Fail | Fail | | |
| Rheolate® 216 | Elementis | | | Fail | Fail | | |
| Rheolate® 266 | Elementis | | | Fail | Fail | | |
| Rheolate® 288 | Elementis | | | Fail | Fail | | |
| Rheolate® 666 | Elementis | | | Fail | Fail | | |
| Macat® AO-18:1 | Mason Chemical | Fail | Fail | Pass | Pass | Pass | Pass |

Different amine oxide, betaine rheology modifiers from Mason Chemical have differing viscosity in water solution.

TABLE 2

| Rheology Modifiers | Active Ingredient % | Brookfield Spindle # | Viscosity (cP) @ 30 rpm |
|---|---|---|---|
| Macat® AO-18:1 | 0.76 | 3 | 220 |
| Macat® AO-18:1 | 2.23 | 3 | 1708 |
| Macat® AO-18 | 0.76 | 2 | 44 |
| Macat® AO-18 | 2.23 | 3 | 1048 |
| Macat® AO-16 | 0.76 | 2 | 39 |
| Macat® AO-14 | 0.76 | 1 | 1.8 |
| Macat® TAM-2 | 0.89 | 1 | 1.8 |
| Masurf® D125 | 0.64 | 1 | 1.9 |
| Masamide® REP | 0.92 | 1 | 1.8 |

Oleyl dimethyl amineoxide (ODMAO) demonstrated significant solubility over 1000 ppm in different hydrocarbons.

TABLE 3

| | Total ODMAO Addition (ppm) | Solubility by Weight Calculation (ppm) | Solubility by GC (ppm) |
|---|---|---|---|
| Wet Gasoline | 2581 | 2574 | 1474 |
| Dry Gasoline | 2559 | 2447 | 1839 |
| Wet Diesel | 2266 | 1942 | 1123 |
| Dry Diesel | 2230 | 1729 | 1228 |

*Wet gasoline and diesel are water saturated and dry hydrocarbons are pared by pass through molecular sieve.

Specific testing regarding aqueous drag reducing agent suspension was done with polymer contents between 20 wt % and 30 wt % and oleyl dimethylamine oxide rheology modifier between 0.5 wt % to 2 wt % and the prepared suspensions resulted in no separation of the aqueous drag reducing polymer after four weeks.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. An aqueous drag reducer comprising:
    water;
    an amine oxide rheology modifier that is soluble in hydrocarbons; and
    a polymer that is soluble in the hydrocarbons and has a molecular weight greater than one million.

2. The aqueous drag reducer of claim 1, wherein the polymer has a molecular weight greater than five million.

3. The aqueous drag reducer of claim 1, wherein the aqueous drag reducer comprises a surfactant.

4. The aqueous drag reducer of claim 1, wherein the amine oxide rheology modifier has an alkyl chain greater than C14.

5. The aqueous drag reducer of claim 1, wherein the amine oxide rheology modifier comprises: oleyl dimethyl amine oxide, stearyl dimethylamine oxide, cetyl dimethylamine oxide, myristyl dimethyl amine oxide, lauryl dimethyl amine oxide, coco alkyl dimethyl amine oxide, decyl dimethyl amine oxide and alkyl dihydroxyethyl amine oxide or combinations thereof.

6. The aqueous drag reducer of claim 1, wherein the hydrocarbons are refined hydrocarbons.

7. The aqueous drag reducer of claim 1, wherein the aqueous drag reducer does not significantly change the viscosity of the hydrocarbons the aqueous drag reducer is injected into.

8. The aqueous drag reducer of claim 1, wherein the aqueous drag reducer is soluble in the hydrocarbons at normal usage levels.

9. The aqueous drag reducer of claim 8, wherein normal usage levels are less than 25 ppm of the polymer in the hydrocarbons.

10. A method comprising:
producing a suspension medium;
incorporating a polymer having a molecular weight greater than one million to the suspension medium to produce a suspension; and
adding a hydrocarbon soluble amine oxide rheology modifier to the suspension to produce an aqueous drag reducer.

11. The method of claim 10, wherein the suspension medium is made by mixing water and a surfactant.

12. A method comprising:
mixing water and a surfactant to produce a suspension medium;
incorporating a polymer having a molecular weight greater than five million, to the suspension medium to produce a suspension;
adding an amine oxide rheology modifier that is soluble in a refined hydrocarbon to the suspension to produce an aqueous drag reducer; and
injecting the aqueous drag reducer into the refined hydrocarbon pipeline.

\* \* \* \* \*